Figure 1:
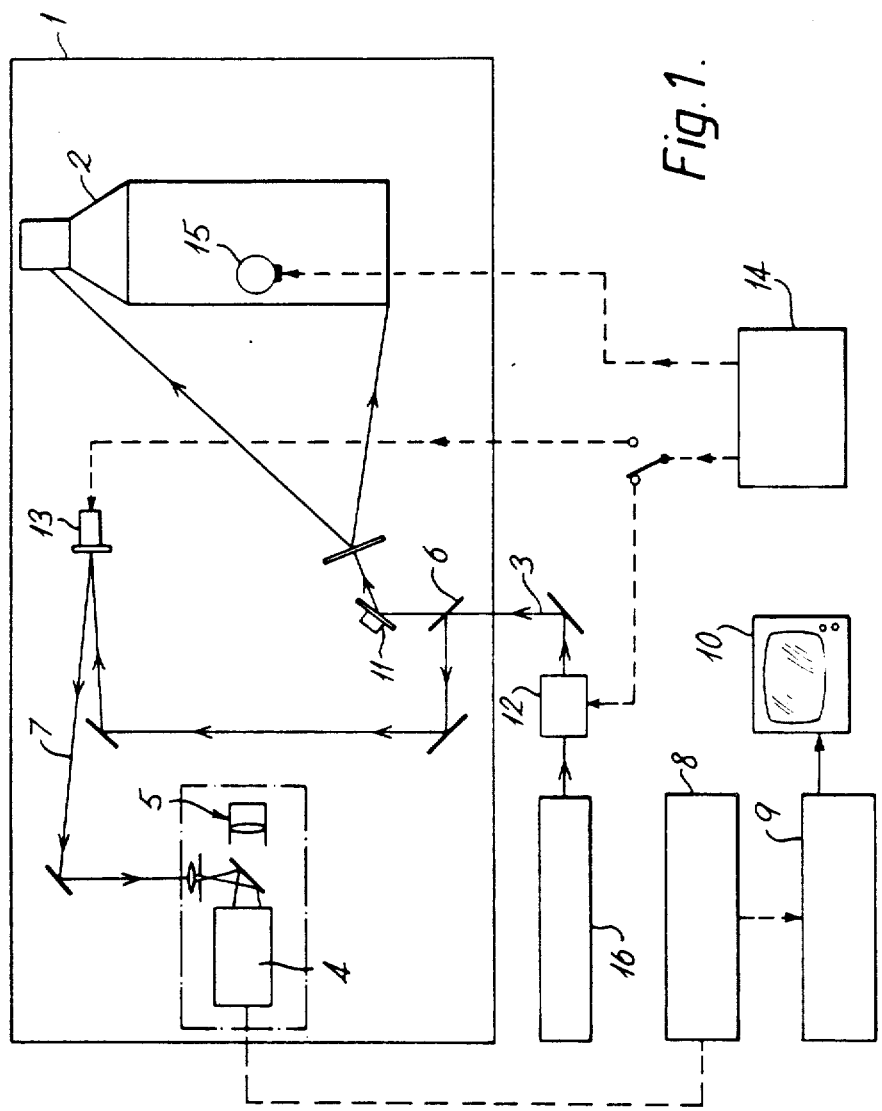

United States Patent [19]

Montgomery et al.

[11] Patent Number: 4,913,550
[45] Date of Patent: Apr. 3, 1990

[54] INTERFEROMETRIC MEASUREMENT METHOD AND APPARATUS

[75] Inventors: Paul C. Montgomery, Huddersfield; John R. Tyrer, Ratcliffe on the Wreake, both of England

[73] Assignee: National Research Development Corp., United Kingdom

[21] Appl. No.: 287,544

[22] Filed: Dec. 19, 1988

Related U.S. Application Data

[63] Continuation of Ser. No. 168,558, Mar. 4, 1988, abandoned, which is a continuation of Ser. No. 907,825, Sep. 16, 1986, abandoned.

[30] Foreign Application Priority Data

Sep. 16, 1985 [GB] United Kingdom ............... 8522820

[51] Int. Cl.$^4$ ................................................ G01B 9/02
[52] U.S. Cl. ..................................... 356/354; 356/360
[58] Field of Search ............... 356/354, 359, 360, 35.5

[56] References Cited

U.S. PATENT DOCUMENTS

| 3,899,921 | 8/1975 | Hockley | 356/354 X |
| 4,013,366 | 3/1977 | Philbert | 356/351 X |
| 4,018,531 | 4/1977 | Leendertz | 356/360 |
| 4,191,476 | 3/1980 | Pollard | 356/360 X |
| 4,352,565 | 10/1982 | Rowe et al. | 356/360 |
| 4,637,724 | 1/1987 | Howell et al. | 356/354 X |
| 4,647,154 | 3/1987 | Birnbach et al. | 356/345 X |
| 4,652,131 | 3/1987 | Fercher et al. | 356/354 X |

FOREIGN PATENT DOCUMENTS 0253945 12/1985 Japan ............................... 356/359

OTHER PUBLICATIONS

Lokberg, "Use of Chopped Laser Light in Electronic Speckle Pattern Interferometry", Applied Optics, vol. 18, No. 14, Jul. 15, 1979, pp. 2377-2384.

Hurden, "An Instrument for Vibration Mode Analysis Using Elec. Speckle Pat. Interferometry", NDT International, Jun. 1982, vol. 15, No. 3, pp. 143-148.

Lokberg, "Mapping of M-Plane Vibration Modes by Electronic Speckle Pattern Interferometry", Optical Engineering, vol. 24, No. 2, Mar./Apr. 1985, pp. 356-359.

"Real-Time Holography Shows up the Flaws and Stresses", Sensor Review, Jul. 1981, vol. 1, No. 3, pp. 116-117.

Primary Examiner—Eugene R. LaRoche
Assistant Examiner—Seung Ham

[57] ABSTRACT

An electronic speckle pattern interferometric for measuring the movement of a vibrating body (2) uses a coherent light source (16) to illuminate the body. A television camera (4) receives radiation scattered by the body and from a reference beam (7) to form a speckle pattern. Successive measurements are stored in a frame store (8, 9) and displayed on a monitor (10).

7 Claims, 4 Drawing Sheets

INTERFEROMETRIC MEASUREMENT METHOD AND APPARATUS

This is a continuation of application Ser. No. 168,558, filed Mar. 4, 1988, which was abandoned upon the filing hereof; which was a continuation of Ser. No. 907,825, filed Sept. 16, 1986, abandoned.

This invention relates to methods of and apparatus for interferometric measurement and, in particular, to the modal analysis of vibrating structures by means of electronic speckle pattern interferometry (ESPI).

The conventional method of assessing the modal behaviour of structures is by the use of accelerometers. The object of performing such modal analysis is to gain an understanding of how the structure vibrates so that improvements in its behaviour can be introduced. For an engine assembly this may involve modifications to the design, constraints on the way the engine is installed in the vehicle and an indication of the engine's likely noise radiating properties.

Accelerometers monitor the surface vibration of the structure while it is being excited either sinusoidally or more generally by random or pseudo-random input. The input is usually provided by an electro-mechanical vibrator attached to the structure. A series of acceleration measurements are taken over the structure, recorded and analysed by computer to furnish a display—usually animated—of how the structure vibrates at its resonant frequencies. As the frequency of the vibration modes increases, the spatial size of the modes decreases and the separation of accelerometers used to make the measurements must be reduced accordingly.

For an engine assembly the procedure would involve making measurements at typically 100 positions on the side of the block using a 5 cm grid. This would enable modes up to typically 4000 Hz to be analysed. The noise characteristics of engines are such that modal information above this frequency is usually not required. It would not be feasible to carry out measurements at higher frequencies because the task of acquiring acceleration data at many more than 100 sites on each side of an engine would be prohibitively time consuming.

In view of the time needed to perform such modal analysis the use of optical techniques for the measurement of vibration behaviour of structures has been investigated. Potentially, optical methods have the capability to make rapid, full-field, non-contacting measurements of vibration behaviour. In the past holography has been used to record vibration contour maps of many engineering components—particularly by the aerospace industry. (Butters, J. N. "Applications of ESPI to NDT", Optics and Laser Technology, VOL 9 (1977) 117–123.) The information about the vibration behaviour stored in the hologram can be displayed in the form of a set of fringes each of which defines a line of equal vibration amplitude. Areas on the structure which have not vibrated (nodes) appear as bright fringes on the image of the structure reconstructed by the hologram. Areas which have executed vibration displacements with an amplitude of $\lambda/4$ ($\lambda$ is the wavelength of laser illumination used to make the hologram) also appear as bright fringes. These, however, are not as bright as the nodes. Larger amplitude vibrations appear as fringes with a contour interval of $\lambda/4$ and with progressively less distinct fringes being generated as the vibration amplitude increases.

Such holographic vibration maps can provide very useful information about vibration characteristics of structures. There are, however, drawbacks to the acquisition of such modal maps. The measurements are accomplished by using the interference properties of laser illumination and, hence, they must be carried out under conditions of extreme stability if the necessity for a pulsed laser is to be avoided. Although severe these interferometric requirements can be satisfied in a laboratory environment. A more serious limitation to the practical application of such optical modal analysis techniques based on holography is that a photographic processing stage is involved.

This means that the production of a modal map by time-average holography takes typically 20 minutes. Furthermore it is necessary to know the resonances of interest before a hologram is produced.

Rapid in situ holographic development systems are available relying on thermo-plastic/electrostatic principles but these cannot perform the real-time vibration scanning role that is required. The sensitivity of these mediums is less than typical holographic plates and as their spatial resolution is also lower the size of the object which can be investigated is in practice severely limited. Further, if as is desirable, the structure is to be studied as the excitation frequency is scanned, any holographic based system must operate in the live fringe mode. This puts constraints on the stability requirements for the system and the hologram material that are not currently satisified by thermoplastic media.

According to the present invention, there is provided apparatus for the interferometric measurement of the movement of a vibrating object comprising a source of coherent radiation arranged to illuminate the object, means for focussing radiation scattered from a surface of the object on to a radiation sensor to produce an electrical signal dependent on the instantaneous amplitude of the receiver scattered radiation, further means for focussing radiation from a reference beam on to said radiation sensor to generate a speckle pattern characteristic of the object at a given position and comparator means to compare the speckle patterns characteristic of the object at a first and a second position.

The technique of ESPI replaces the photographic stage of holography with an electronic processing stage and utilises a high resolution TV camera instead of a photographic emulsion. The result is a system which can measure in real-time the vibration modes of a structure and display them on a TV. The system is based, like holography, on the phenomenon of optical interference. It uses illumination and requires that the whole measurement system be isolated from extraneous vibrations. This is usually accomplished by the use of an air cushion optical table, in a manner identical to that used with a holographic system.

Figure 2:
Figure 3:

An embodiment of the invention will now be described by way of example with reference to the accompanying drawings in which:

FIG. 1 is a diagrammatic representation of an electronic speckle interferometer system FIG. 2 is a photographic reproduction of an ESPI time average modal map produced by conventional methods; and FIGS. 3–6 are photographic reproductions of speckle averaged modal maps.

Referring now to the drawings, FIG. 1 is a schematic drawing of a typical ESPI system which consists, in essence, of three parts, a test bed 1 on which the components under study are mounted, the optics for illuminating and viewing the component and the electronics for processing the video image.

In operation the system is similar to that of focused image holography. An object 2 is uniformly illuminated by a laser beam 3 produced by an argon laser 16 and light scattered from the surface of the object is imaged onto a high resolution TV camera sensor 4 by a lens 5. Between the lines and the sensor a beam-splitting device 6 is positioned such that a second uniform wavefront from the laser can be introduced onto the camera sensor, in addition to the first. This second beam 7 is obtained by a beam splitter 6 which separates a fraction of the light out of the laser beam before it illuminates the object. The secondary beam 7 acts as a reference wavefront in the system. The appearance of an object in laser illumination is quite different from that in incandescent illumination in that the surface of the object appears to be 'grainy' or 'speckled'. These speckles contain information about the positions in space of the illuminated points relative to the observer. If the wavefront from the object carrying this information is mixed with a reference wavefront—as in the ESPI system—then a particularly simple relationship between speckle behaviour and object movement results.

For the system shown in FIG. 1, movements of the object along the optical axis of the camera will result in cyclical variations in the brightness of speckles. The speckles will cycle in brightness every time the object moves line-of-sight by $\lambda/2$, where $\lambda$ is the wavelength of laser illumination used. As the speckles can be made to be large enough to be resolved by the camera sensor simply by closing the lens aperture sufficiently, it is possible to monitor these cyclic variations in speckle brightness with a TV camera.

In a holographic system the information about the object is stored as a very high frequency spatial carrier wave in the photographic emulsion (typically 1/2000 mm in spacing) and is thus not capable of being recorded directly with a TV camera which operates with typically 625 lines.

In the ESPI system a speckle pattern of the object can be held in a frame store 8, 9 to act as a reference object position. Subsequent movement of the object, recorded at TV frame rate, will result in changes in the speckle pattern intensity. Simply by continuously subtracting new TV images from the stored record a display of contour lines of object displacement can be generated. This appears on the TV monitor 10 in the system as a set of dark fringes—the loci of equal object movements.

If the object is vibrating, rather than suffering a static displacement, then analysis shows that, like time-average holography, fringes of equal vibration amplitude will be generated.

FIG. 2 is a photographic reproduction of a conventional ESPI time average modal map which suffers from the disadvantages that detailed structure of the object cannot be seen, no more than two or three fringes can be counted and no phase information is present.

Various features incorporated in the apparatus of FIG. 1 may be used to overcome these disadvantages.

The information in a speckle pattern interferogram is carried by the randomly sized and positioned speckles. This is true for both the fringe information and the object detail. If a time-average fringe map of a vibration mode is generated it is found that the positions of the fringes does not change much for a small change of a few degrees in the angle at which the laser illuminates the object. However, the brightness of individual speckles in the pattern varies over this small change in the object illumination angle. Hence, if several interferograms, each with a different object illumination direction, are added together and the result displayed, the stationary fringes reinforce in each record but the background speckles average to some uniform level. As the object detail is also stationary with respect to object illumination beam direction it too is enhanced in the resulting speckle.

Positioned in front of the object is a scatter plate 11. Records, averaged over a period of several seconds, form fringe maps of holographic quality, exhibiting an improvement in clarity from that depicted in FIG. 2 to that shown in FIG. 3.

Figure 4:
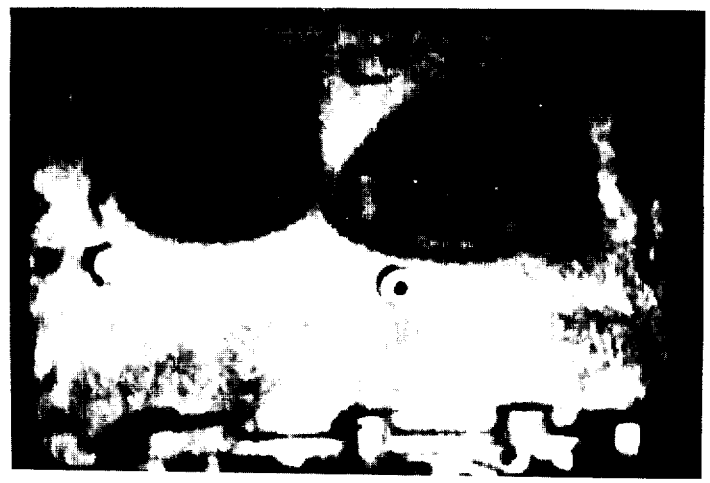

Speckle pattern vibration maps suffer from a problem in common with holographic time-average vibration maps. As the amplitude of the vibration increases the visibility of the fringes decreases. An example of this is shown in FIG. 4 which is a speckle average vibration map on the side of an engine being excited at 3.25 KHz. A zoom lens has been used to give a close up of this region of the water jacket mode. The cause of this loss of fringe visibility is the time average mode of operation used in which speckle patterns are added during the whole of the vibration cycle.

If the object is illuminated only at the extremes of its vibration cycle then this reduction in fringe visibility with increasing vibration amplitude is avoided and all fringes are equally bright. A Pockel's Cell 12 in the laser beam acting as a very fast shutter achieves this. By driving the Pockel's Cell from the same generator as the vibrator, but at twice the frequency, a strobing effect is produced which increases the visibility of high vibration amplitude fringes.

Figure 5:

An example of its effect is shown in FIG. 5 which is a Speckle Strobed version of FIG. 4—the structure being excited at 3.25 KHz; the Pockel's Cell running at 6.5 KHz. A comparison of FIG. 4 and FIG. 5 shows the improvement in fringe visibility at high amplitude vibration sites as a result of using strobed illumination.

Ideally a vibration analysis system needs to be capable of operating in a time-average mode and in a strobed mode. The reason for this is that in the time-average mode the variation in fringe visibility is in itself useful as it identifies regions of the object which are not vibrating at all—these will be the brightest parts of the vibration map and are frequently of particular interest.

The problem of assigning phase to the modal maps produced by either holography or ESPI can be solved by introducing phase modulation into the reference beam path in the system. The map of FIG. 5 demonstrates the ambiguity inherent in the fringes. The two adjacent sets of fringes show the amplitude of the vibrations of the block walls.

They in no way indicate whether the two regions are moving in-phase or out-of-phase, although an educated guess would suggest that the latter is the most likely in this case.

Information about the phase behaviour of the structure can be obtained optically over the whole of the surface by reflecting the reference beam from a mirror 13 mounted on a piezo-electric crystal and driving the mirror from an oscillator 14 at the same frequency as the vibrator 15.

This has the effect of changing the reference beam pathlength sinusoidally. Hence, regions of the structure that are vibrating in phase with the reference mirror, and with the same amplitude will generate time-average fringes of maximum brightness. These regions have in effect become stationary as far as the optical interferometer is concerned.

All regions of the object's surface which satisfy this condition will be highlighted in this way. With the reference mirror vibrated 180° out-of-phase with the vibrator regions in anti-phase with those highlighted initially will be identified by bright 'zero-order' fringes.

Figure 6:

An example of this effect is shown in FIG. 6 in which the Speckle Average map of FIG. 5 is repeated with the reference beam vibrated 180° out-of-phase with the vibrator. The first bright contour on the left-hand set of fringes is highlighted. This shows that this region of the object is moving 180° out-of-phase with the vibrator. The two high amplitude vibration regions identified in FIG. 5 are thus moving in anti-phase.

Further developments of the principles described above fall within the ambit of the invention.

These include the use of fibre optic elements which, in conjunction with semiconductor lasers and solid state cameras will lead to very small, robust, fully packaged systems.

The introduction of 1200 line TV systems together with 1024×1024 element frame stores will lead to higher quality fringe maps and computer-based image analysis software permits full-field analysis of interferometric data in real time.

We claim:

1. Apparatus for interferometric measurement of movement of a vibrating object, using a radiation sensor, comprising:

a source of coherent radiation arranged to illuminate the object, means for focussing radiation scattered from a surface of the object on to the radiation sensor to produce an electrical signal dependent on an instantaneous amplitude of received scattered radiation, means for varying a direction of illumination of said object by radiation from said source, further means for focussing radiation from a reference beam on to the radiation sensor to generate a speckle pattern characteristic of the object at a given position, and comparator means for comparing speckle patterns respectively characteristic of the object at a first and a second position.

2. Apparatus for the interferometric measurement of the movement of a vibrating object as claimed in claim 1 wherein said radiation sensor is a television camera and wherein said comparator means includes a frame store which stores at least one of the patterns to be compared.

3. Apparatus for the interferometric measurement of the movement of a vibrating object as claimed in claim 1 further including means for combining the speckle patterns produced at different directions of illumination.

4. Apparatus for the interferometric measurement of the movement of a vibrating object as claimed in claim 1 including shutter means to inhibit the formation of an image of said object at predetermined parts of its vibration cycle.

5. Apparatus for the interferometric measurement of the movement of a vibrating object as claimed in claim 4 wherein said shutter means is a Pockel's cell.

6. Apparatus for the interferometric measurement of the movement of a vibrating object as claimed in any one of the preceding claims further including modulator means to modulate the radiation of said reference beam.

7. Apparatus for the interferometric measurement of the movement of a vibrating object as claimed in claim 6 wherein said modulator means comprises a vibrating mirror.

* * * * *